(12) United States Patent
Felger

(10) Patent No.: US 6,347,603 B1
(45) Date of Patent: Feb. 19, 2002

(54) ANIMAL EXERCISING AND REHABILITATION EQUIPMENT

(76) Inventor: H. Victor Felger, 2524 E. Old SR 22, Hartford City, IN (US) 47348

( * ) Notice: Subject to any disclaimer, the term of this patent is extended or adjusted under 35 U.S.C. 154(b) by 0 days.

(21) Appl. No.: 09/497,984

(22) Filed: Feb. 4, 2000

Related U.S. Application Data
(60) Provisional application No. 60/119,246, filed on Feb. 9, 1999.

(51) Int. Cl.[7] .............................................. A01K 15/02
(52) U.S. Cl. ........................................ 119/700; 482/54
(58) Field of Search ............................... 119/700, 703, 119/756; 482/54; 472/48, 91

(56) References Cited

U.S. PATENT DOCUMENTS 5,081,991 A  *  1/1992  Chance ................... 119/700 X
5,162,029 A  *  11/1992  Gerard ..................... 482/54 X
5,178,098 A  *  1/1993  Samberg ..................... 119/756

FOREIGN PATENT DOCUMENTS

GB         2132464    *   7/1984  ................. 119/700

* cited by examiner

Primary Examiner—Robert P. Swiatek
(74) Attorney, Agent, or Firm—Baker Botts L.L.P.

(57) ABSTRACT

Apparatus for use in exercising a dog or other animal on a treadmill. For some applications the apparatus may be releasably secured to the treadmill. For other applications the apparatus may be permanently attached to the treadmill. The apparatus preferably includes first and second generally U-shaped frame members with a pair of side members attached thereto and extending therebetween. One or more rings are provided as part of the apparatus for use in positioning the dog or other animal at a desired location on the treadmill. A system may also be provided for local and/or remote recording, monitoring and evaluation of exercises performed by the dog or other animal.

19 Claims, 3 Drawing Sheets

ANIMAL EXERCISING AND REHABILITATION EQUIPMENT

RELATED APPLICATION

This application claims the benefit of U.S. Provisional Application Ser. No. 60/119,246 filed Feb. 9, 1999.

TECHNICAL FIELD OF THE INVENTION

This invention relates in general to equipment for exercising dogs and other animals and more particularly to an apparatus which may be attached to a treadmill.

BACKGROUND OF THE INVENTION

Dogs and other animals generally need frequent exercise to maintain a healthy condition. Regular exercise is particularly important for animals such as hunting dogs. However, weather conditions or other factors may sometimes prevent owners or trainers from properly exercising their animals. Also, facilities with sufficient size may not always be available for dogs and other animals to obtain the desired amount of exercise. Finally, dogs and other animals recovering from an injury frequently benefit from a regular, carefully controlled exercise program.

SUMMARY OF INVENTION

In accordance with teachings of the present invention apparatus is provided to substantially eliminate or reduce problems associated with providing year round, regulated or controlled exercise for dogs and other animals. The present invention allows a dog, sheep or other animal to be exercised in a relatively small confined area without regard to external factors such as the time of day or weather conditions. One aspect of the present invention includes apparatus which may be attached to a treadmill to properly position a dog or other animal thereon. The apparatus may also provide support for the dog or other animal if required. For some applications the apparatus may be permanently mounted to the treadmill. For other applications the apparatus may be releasably secured to the treadmill. For still further applications, the apparatus may be formed from multiple components which may be easily assembled prior to each exercise period. When no longer in use, the apparatus may be broken down into its individual components for easy storage.

Technical advantages of the present invention include allowing a dog or other animal to be exercised in a controlled, safe environment. The dog or other animal can be properly exercised without regard to the time of day or weather conditions. Also, the present invention allows improved monitoring, carefully controlled and detailed record keeping of each exercise performed by a dog or other animal on a daily, weekly, monthly or annual basis. The results of the exercise program may be maintained and evaluated locally or transmitted to a remote location.

BRIEF OF THE DRAWINGS

For a more complete understanding of the present invention, and the advantages thereof, reference is now made to the following descriptions taken in conjunction with the accompanying drawings, in which.

Figure 5:
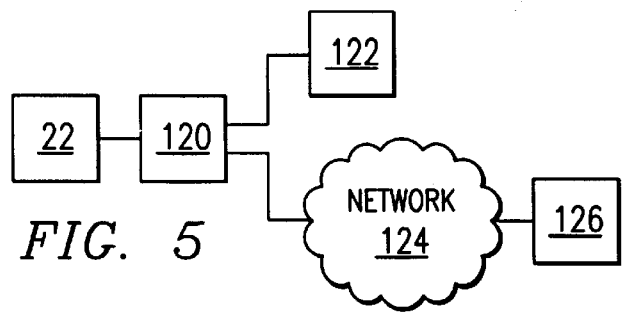
Figure 4:
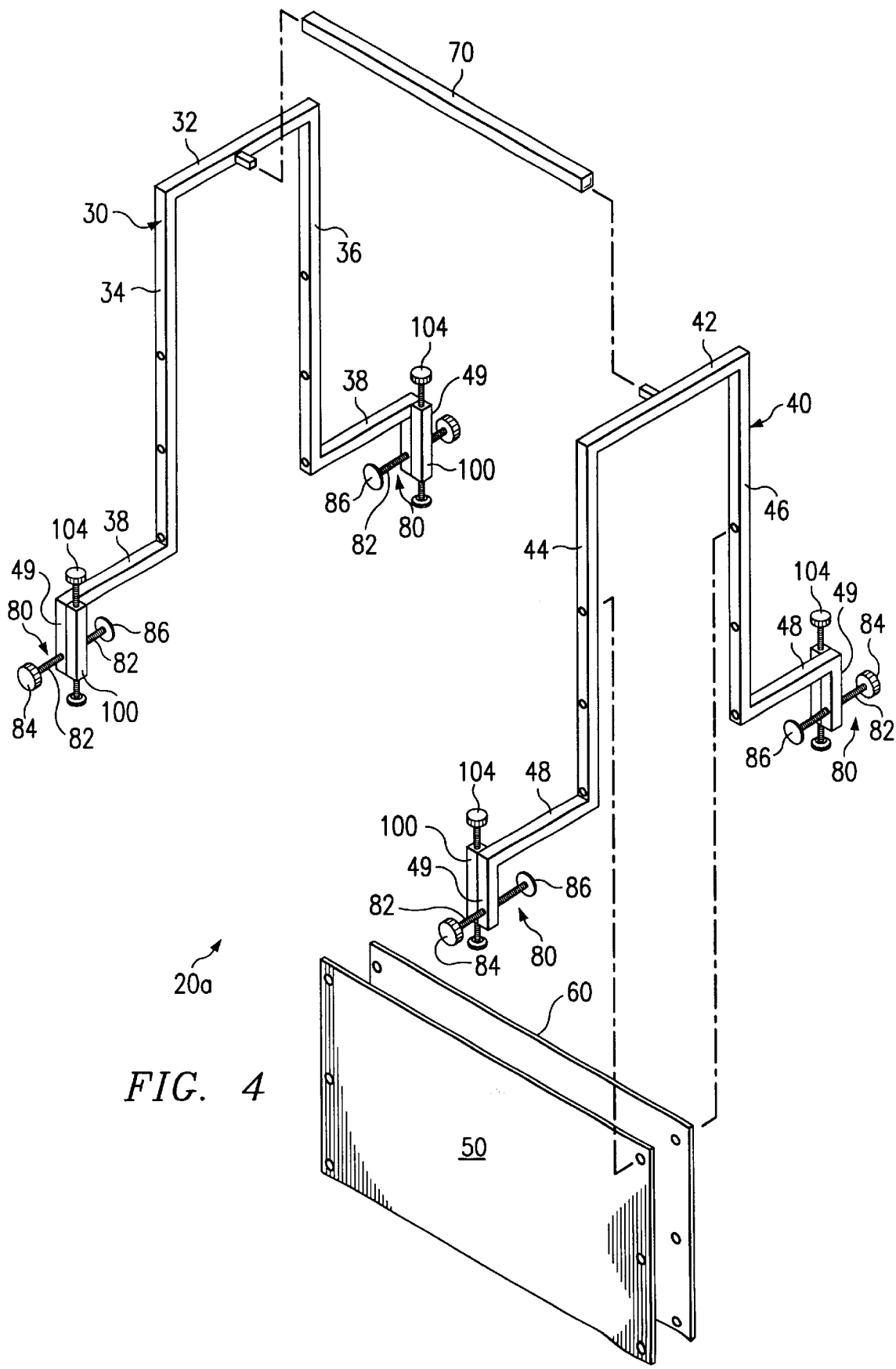

FIG. 4 is a schematic drawing showing an exploded, isometric view of individual components which may be assembled with each other to form an apparatus for mounting on a treadmill in accordance with the teachings of the present invention; and FIG. 5 is a block diagram showing one embodiment of a system for monitoring and evaluating exercises performed by an animal in accordance with teachings of the present invention.

DETAILED DESCRIPTION OF THE INVENTION

Preferred embodiments of the present invention and its advantages are best understood by referring to FIGS. 1 through 5 of the drawings, like numerals being used for like and corresponding parts of the various drawings.

The present invention will be discussed with respect to exercising a dog. However, apparatus incorporating teachings of the present invention may be used with any animal that will benefit from regular, controlled exercise which may be monitored and evaluated.

Figure 1:
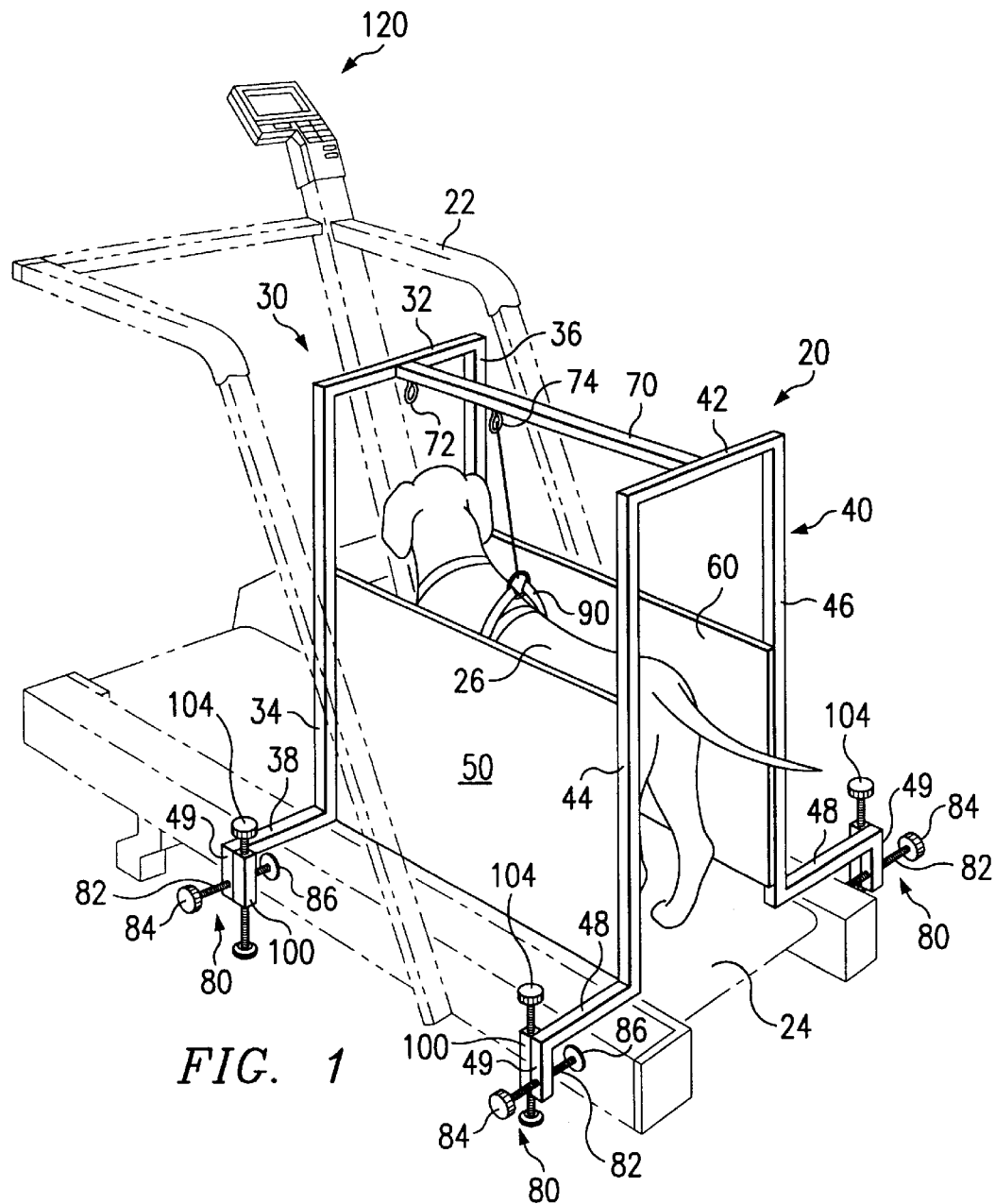
FIG. 1 is an isometric drawing showing apparatus incorporating teachings of the present invention mounted on a treadmill.

Apparatus 20 incorporating one embodiment of the present invention is shown in FIG. 1 mounted on treadmill 22. For some applications an apparatus incorporating teachings of the present invention may be permanently attached to an associated treadmill using appropriate mechanical fasteners, welding techniques and/or adhesive bonding. For the embodiment of the present invention shown in FIGS. 1 through 4, apparatus 20 is preferably releasable secured to treadmill 22.

A treadmill designated Pro Form 585 from Sears & Roebuck Company is an example of one type of treadmill which may be satisfactorily used with apparatus 20. However, apparatus incorporating teachings of the present invention may be used with a wide variety of treadmills and is not limited to use with only treadmill 22 shown in FIG. 1.

Apparatus 20 preferably includes first frame member 30 and second frame member 40. A pair of side members or panels 50 and 60 preferably extend longitudinally between first frame member 30 and second frame member 40. Solid panels are preferably used as side members 50 and 60 to better control and protect dog 26. For some applications, side members 50 and 60 may be a screen or multiple cross bars. Upper or top brace bar 70 preferably extends between first frame member 30 and second frame member 40. For some applications more than one top brace bar may be used to attach first frame member 30 with second frame member 40.

For the embodiment shown in FIGS. 1–4 the various components of apparatus 20 may be manufactured from metal. However, various components particularly panels 50 and 60 may be fabricated from suitable plastic compounds and/or composite materials. Injection molding and/or extrusion techniques may be satisfactorily used to manufacture frame members 30 and 40, panels 50 and 60 and/or top brace bar 70.

First frame member 30 and second frame member 40 preferably have a generally U-shaped configuration defined in part by respective cross bars 32 and 42, respective vertical supports 34 and 36 which extend from opposite ends of cross bar 32 toward continuous tread 24 and vertical supports 44 and 46 which extend from opposite ends of cross bar 42 toward continuous tread 24. Frame members satisfactory for use with the present invention may have other configurations such as semicircular or semi oval shaped.

Apparatus 20 is preferably positioned on treadmill 22 with first frame member 30 disposed adjacent to one end of continuous tread 24 and second frame member 40 disposed adjacent to the opposite end of continuous tread 24. First frame member 30 and second frame member 40 define respective openings which allow dog 26 to be placed within apparatus 20. The U-shaped configuration of first frame member 30 and second frame member 40 allows dog 26 to have unrestricted contact with continuous tread 24. The size and configuration of first frame member 30 and second frame member 40 may be varied to accommodate different sizes and types of dogs or other animals. When dog 26 is properly positioned on continuous tread 24, there are no obstructions adjacent to the front feet or rear feet of dog 26.

Support arms 38 are preferably attached to and extend laterally from respective ends of vertical supports 34 and 36 opposite from cross bar 32. In a corresponding manner, support arms 48 are preferably attached to and extend laterally from respective ends of vertical supports 44 and 46 opposite from cross bar 42. Respective legs 49 are preferably attached to one end of each support arm 38 and 48 opposite from associated vertical supports 34, 36, 44, and 46.

A clamp assembly or other suitable mechanical fastener is preferably attached to each leg 49 for use in releasably securing apparatus 20 with treadmill 22. For the embodiment of the present invention as shown in FIGS. 1 through 4, respective adjustable clamp assemblies 80 are shown attached to each leg 49. Each clamp assembly 80 includes threaded rod 82 extending through a corresponding threaded opening (not expressly shown) in the associated leg 49. A respective knob or handle 84 is provided on one end of each threaded rod 82. A respective disk 86 is preferably attached to the opposite end of each threaded rod 82. Disks 86 are sized to contact the sides of treadmill 22 when apparatus 20 is attached hereto. Threaded rods 82 cooperate with each other to allow releasably attaching apparatus 20 with the sides of treadmill 22.

For the embodiment of the present invention shown in FIGS. 1–4, apparatus 20 also includes respective floor supports 100 attach to each leg 49. Each floor support 100 includes threaded rod 102, knob 104 and disk 106. Knob 104 may be rotated to adjust the position of threaded rod 102 so that the associated floor support 100 may be used to satisfactorily position apparatus 20 relative to treadmill 22 and particularly continuous tread 24.

A wide variety of clamps, mechanical connectors and even Velcro® strips may be satisfactorily used to releasably secure apparatus 20 with treadmill 22. Apparatus incorporating teachings of the present invention is not limited to use with only adjustable clamp assembly 80.

An appropriately sized harness is preferably used to releasably secure a dog or other animal within apparatus 20 at a desired location on treadmill 22. The harness may be formed form leather, a web mesh or any other suitable material. The harness is preferably secured to the animal's chest and shoulders to assist in maintaining the animal at the desired location on treadmill 22 during each exercise period. For dogs, one type of satisfactory harness is sometimes referred to as a "roading harness". A non-choke, safety collar (not expressly shown) is also preferably used to position a dog or other animal within apparatus 20.

Figure 2:
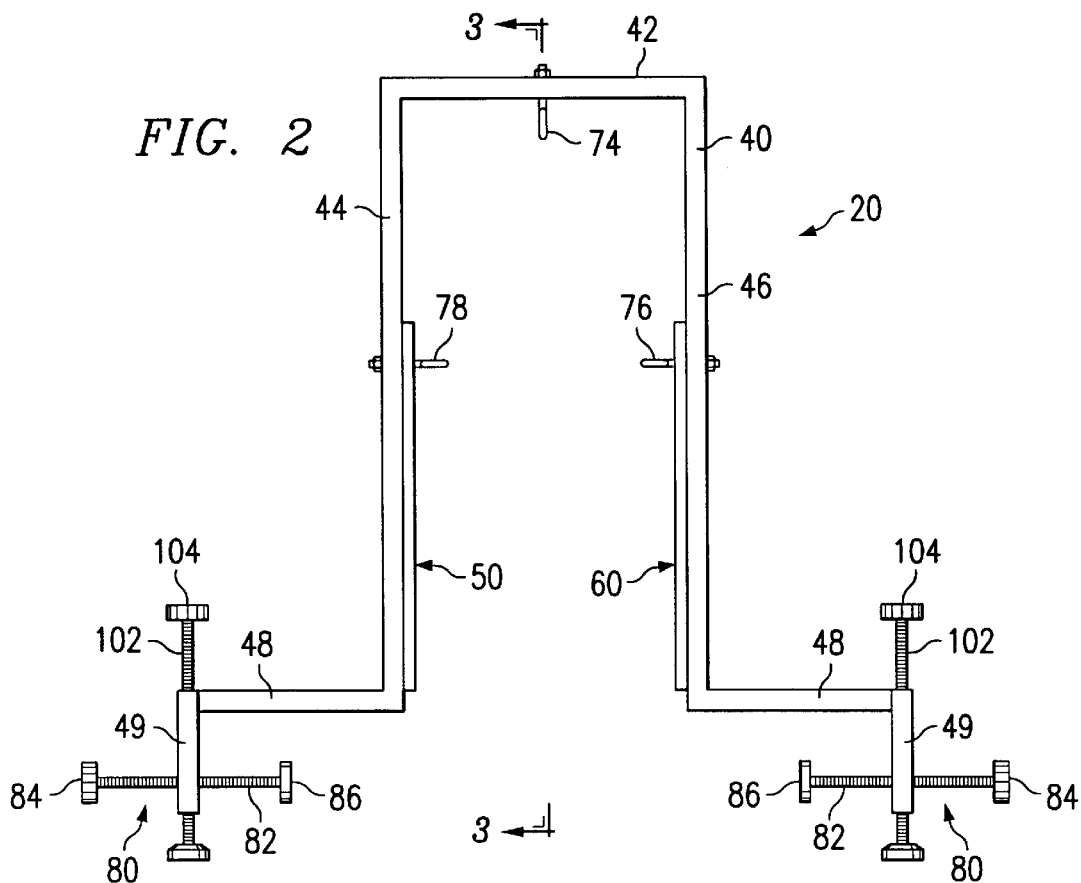
FIG. 2 is an isometric drawing showing an end view of the apparatus of FIG. 1.
Figure 3:
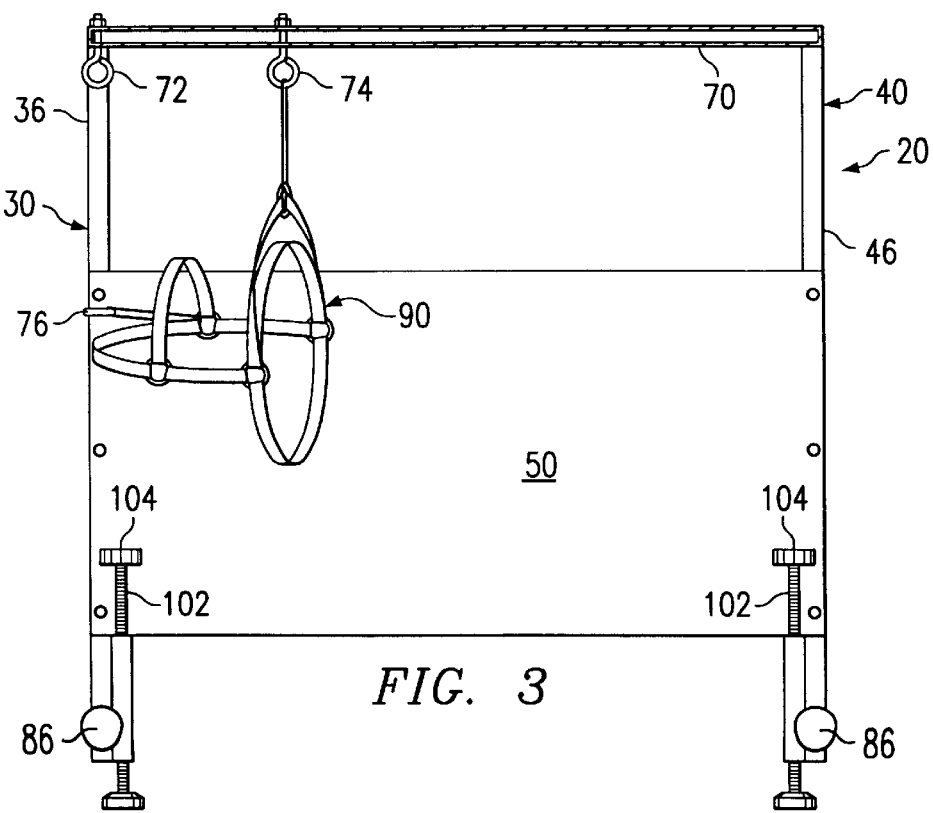
FIG. 3 is a schematic drawing in section and in elevation with portions broken away taken along lines 3—3 of FIG. 2.

For the embodiment of the present invention as best shown in FIGS. 1 and 2, first ring 72 is preferably attached to top brace bar 70 adjacent to first frame member 30. Second ring 74 is shown attached to top brace bar 70 spaced longitudinally from first ring 72. Rings 72 and 74 provide alternative locations for securing harness 90 thereto. A pair of rings 76 and 78 are preferably attached to respective vertical supports 36 and 34 of first frame member 30. See FIGS. 2 and 3. Rings 72, 74, 76 and 78 operate with each other to provide alternative locations for attaching harness 90 to properly position dog 26 within apparatus 20. The size of harness 90 and the locations for attachment to apparatus 20 may be varied depending upon the size of dog 26 or other animal which will exercised using treadmill 22.

The length of cross bar 32 and cross bar 42 define the width of the opening through respective first frame member 30 and second frame member 40. The length of vertical supports 34, 36, 44, and 46 cooperate with each other to generally define the height of upper brace bar 70 above continuous tread 24. For one application, top brace bar 70 and panels 50 and 60 have a length of approximately thirty-six inches (36"). Cross bars 32 and 42 have a length of approximately sixteen inches (16"). Vertical supports 34, 36, 44, and 46 have a length of approximately thirty-two inches (32").

Side members 50 and 60 have a generally rectangular configuration. For one application side members 50 and 60 have a length of approximately thirty-six inches (36") and a height of approximately sixteen inches (16"). Side members 50 and 60 are preferably attached near the respective ends of first frame member 30 and second frame 40 with a minimum amount of clearance between the respective edge of each side member 50 and 60 and continuous tread 24. Positioning side members 50 and 60 relatively close to continuous tread 24 with help to maintain dog 26 in the proper position and will also protect the feet of dog 26.

Support arms 38 and 48 preferably have a length of eighteen inches (18"). For one application the overall width of apparatus 20 is approximately thirty-six inches (36"), overall height thirty-six inches (36") and overall length thirty-six inches (36"). Threaded rods 82 and 102 have a length of approximately nine inches (9") which will allow apparatus 20 to be releasably installed on a wide variety of different sizes and types of treadmills.

For the embodiment of the present invention as shown in FIG. 1, treadmill 22 preferably includes control panel 120 which regulates operation of treadmill 22, among other features control panel 120 may be used to record the weight of dog 26 and to set the desired speed, elevation and length of time for each exercise period. Control panel 120 may be used to record this information for different dogs or other animals for an extended period of time.

For some applications, information concerning the operation of treadmill 22 and the dog or other animal being exercised thereon may be transmitted from control panel 120 to a local recorder 122. For other applications, the information may be transmitted from control panel 120 through communication network 124 to one or more remotely located recorders.

Apparatus 20 allows dog 26 to be safety positioned on treadmill 22 and exercise for a desired time period at a desired speed and elevation. Information concerning each exercise period may be recorded and evaluated locally and/or remotely. The present invention allows a trainer, owner and/or veterinarian to monitor the performance of a dog, sheep or other animal and to evaluate an associated training or rehabilitation program.

Although the present invention and its advantage have been described in detail, it should be understood that various changes, substitutions and alterations can be made therein without the departing from the spirit and the scope of the invention as defined in the following claims.

What is claimed is:

1. Apparatus for exercising an animal on a treadmill comprising:
   a first frame member and a second frame member;
   a pair of side members respectively attached to the first and second frame members and extending therebetween; and
   means for releasably attaching the apparatus to the treadmill.

2. The apparatus of claim 1 further comprising a top brace bar attached to and extending between the first and second frame members.

3. The apparatus of claim 1 wherein the means for releasably attaching further comprises:
   a pair of support arms attached to and extending from each frame member; and
   a respective adjustable clamp assembly attached to each support arm.

4. The apparatus of claim 1 wherein the means for releasably attaching further comprises:
   a pair of support arms attached to and extending from each frame member; and
   a respective floor support attached to each support arm.

5. The apparatus of claim 1 further comprising:
   a top brace bar attached to and extending between the first and second frame members; and
   at least one ring attached to the top brace bar for use in securing the animal at a desired location relative to the treadmill.

6. The apparatus of claim 1 further comprising at least one ring attached to the first frame member for use in positioning the animal at a desired location relative to the treadmill.

7. Apparatus for exercising an animal on a treadmill having a continuous tread comprising:
   a first, generally U-shape frame member and a second, generally U-shape frame member;
   a pair of side members respectively attached to the first frame member and the second frame member;
   the side members extending generally parallel with each other and spaced from each other; and
   the first frame member and the second frame member having means for releasable attachment to the treadmill.

8. The apparatus of claim 7 further comprising each side member positioned immediately adjacent to the continuous tread to assist in maintaining the animal at a desired location on the treadmill.

9. The apparatus of claim 7 further comprising a top brace bar attached to and extending between the first and second frame members.

10. The apparatus of claim 7 further comprising:
    a top brace bar attached to and extending between the first and second frame members; and
    at least one ring attached to the top brace bar for use in securing the animal at a desired location relative to the continuous tread.

11. The apparatus of claim 7 further comprising at least one ring attached to the first frame member for use in positioning the animal at a desired location relative to the continuous tread.

12. Apparatus for exercising an animal on a treadmill having a continuous tread comprising:
    a first, generally U-shape frame member and a second, generally U-shape frame member;
    a pair of side members respectively attached to the first frame member and the second frame member;
    the side members extending generally parallel with each other and spaced from each other;
    a pair of support arms attached to and extending from each frame member; and
    a respective adjustable clamp assembly attached to each support arm to releasably attach the associated frame member to the treadmill.

13. Apparatus for exercising an animal on a treadmill having a continuous tread comprising:
    a first, generally U-shape frame member and a second, generally U-shape frame member;
    a pair of side members respectively attached to the first frame member and the second frame member;
    the side members extending generally parallel with each other and spaced from each other;
    the first frame member and the second frame member having means for releasable attachment with the treadmill;
    a pair of support arms attached to and extending from each frame member; and
    a respective floor support attached to each support arm.

14. Apparatus for exercising an animal comprising:
    a treadmill having a continuous tread;
    a first, generally U-shape frame member and a second, generally U-shape frame member;
    a pair of side members respectively attached to the first frame member and the second frame member;
    the side members extending generally parallel with each other and spaced from each other;
    the first frame member and the second frame member attached to the treadmill;
    a top brace bar attached to and extending between the first and second frame members;
    at least two rings attached to the top brace bar;
    at least two rings attached to the first and second frame members; and
    the rings attached to the top brace bar and the rings attached to the first and second frame members cooperating with each other for use in positioning the animal at a desired location relative to the continuous tread.

15. Apparatus for exercising a dog on a treadmill having a continuous tread comprising:
    a first, generally U-shaped frame member and a second, generally U-shaped frame member;
    a pair of side members respectively attached to the first and second frame members;
    the side members extending generally parallel with each other and spaced from each other;
    at least one top brace bar attached to and extending between the first frame member and the second frame member; and
    the first frame member and the second frame member having means for releasable attachment to the treadmill.

16. The apparatus of claim 15 further comprising each side member positioned immediately adjacent to the continuous tread to assist in maintaining the feet of the dog in contact with the continuous tread.

17. The apparatus of claim 15 further comprising at least one ring attached to the top brace bar and at least one ring attached to the first frame member for use in positioning the dog at a desired location relative to the continuous tread.

18. The apparatus of claim 15 further comprising a system for locally and remotely recording, monitoring and evaluating exercises performed by the dog.

19. Apparatus for exercising a dog on a treadmill having a continuous tread comprising:

a first, generally U-shaped frame member and a second, generally U-shaped frame member;

a pair of side members respectively attached to the first and second frame members; the side members extending generally parallel with each other and spaced from each other;

at least one top brace bar attached to and extending between the first frame member and the second frame member;

a pair of support arms respectively attached to and extending from each frame member;

a respective adjustable clamp assembly attached to each support arm for use in releasably attaching the associated frame member with the treadmill; and a respective floor support attached to each support arm.

\* \* \* \* \*